(12) United States Patent
Kim et al.

(10) Patent No.: US 12,441,982 B2
(45) Date of Patent: Oct. 14, 2025

(54) PHARMACEUTICAL COMPOSITION CONTAINING NEPRILYSIN-OVEREXPRESSING STEM CELL, CONDITIONED MEDIUM THEREOF, AND EXOSOME ISOLATED THEREFROM AS ACTIVE INGREDIENT FOR PREVENTION OR TREATMENT OF COGNITIVE IMPAIRMENT

(71) Applicant: DESIGNED CELLS CO.,LTD., Cheongju-si (KR)

(72) Inventors: Yun Bae Kim, Sejong-si (KR); Ehn Kyoung Choi, Daejeon (KR); Tae Myoung Kim, Cheongju-si (KR)

(73) Assignee: DESIGNED CELLS CO., LTD., Cheongju-si (KR)

( * ) Notice: Subject to any disclaimer, the term of this patent is extended or adjusted under 35 U.S.C. 154(b) by 312 days.

(21) Appl. No.: 17/937,096

(22) Filed: Sep. 30, 2022

(65) Prior Publication Data

US 2023/0096790 A1 Mar. 30, 2023

(30) Foreign Application Priority Data

Sep. 30, 2021 (KR) .................. 10-2021-0129385
Aug. 30, 2022 (KR) .................. 10-2022-0109195

(51) Int. Cl.
*C12N 5/073* (2010.01)
*A61P 25/28* (2006.01)

(52) U.S. Cl.
CPC ............ *C12N 5/0605* (2013.01); *A61P 25/28* (2018.01); *C12N 2500/76* (2013.01)

(58) Field of Classification Search
None
See application file for complete search history.

(56) References Cited

U.S. PATENT DOCUMENTS

| | | | |
|---|---|---|---|
| 10,167,448 | B2 | 1/2019 | Chang et al. |
| 10,238,692 | B2 | 3/2019 | Yang et al. |
| 11,524,036 | B2 | 12/2022 | Lew et al. |
| 2014/0341882 | A1 | 11/2014 | Ochiya |

FOREIGN PATENT DOCUMENTS

| | | |
|---|---|---|
| KR | 10-2006-0062688 | 6/2006 |
| KR | 10-1091117 | 12/2010 |
| KR | 20140127692 A * | 4/2013 |
| KR | 10-2017-0044999 | 4/2017 |
| KR | 10-2018-0131158 | 12/2018 |
| KR | 10-2019-0066885 | 6/2019 |
| KR | 10-2019-0092978 | 8/2019 |
| KR | 10-2021-0066636 | 6/2021 |

OTHER PUBLICATIONS

Blurton-Jones M, Spencer B, Michael S, et al. Neural stem cells genetically-modified to express neprilysin reduce pathology in Alzheimer transgenic models .Stem Cell Res Ther. 2014;5(2):46. doi: 10.1186/s13287-024-03702-7]. Stem Cell Res Ther. 2014;5(2):46. Published Apr. 16, 2014. doi:10.1186/scrt440 (Year: 2014).*
Katsuda T, Tsuchiya R, Kosaka N, et al. Human adipose tissue-derived mesenchymal stem cells secrete functional neprilysin-bound exosomes. Sci Rep. 2013;3:1197. doi:10.1038/srep01197 (Year: 2013).*
Lavrentieva A, Majore I, Kasper C, Hass R. Effects of hypoxic culture conditions on umbilical cord-derived human mesenchymal stem cells. Cell Commun Signal. 2010;8:18. Published Jul. 16, 2010. doi:10.1186/1478-811X-8-18 (Year: 2010).*
Morley JE. An Overview of Cognitive Impairment. Clin Geriatr Med. 2018;34(4):505-513. doi:10.1016/j.cger.2018.06.003 (Year: 2018).*
Zheng XY, Wan QQ, Zheng CY, et al. Amniotic Mesenchymal Stem Cells Decrease Aβ Deposition and Improve Memory in APP/PS1 Transgenic Mice. Neurochem Res. 2017;42(8):2191-2207. doi:10.1007/s11064-017-2226-8 (Year: 2017).*
Marr RA, Rockenstein E, Mukherjee A, et al. Neprilysin gene transfer reduces human amyloid pathology in transgenic mice. J Neurosci. 2003;23(6):1992-1996. doi:10.1523/JNEUROSCI.23-06-01992.2003 (Year: 2003).*
Lingling Yang, Jianrong Hao, Jing Zhang, Wenjun Xia, Xifeng Dong, Xiaoyan Hu, Feng Kong, Xing Cui, Ginsenoside Rg3 promotes beta-amyloid peptide degradation by enhancing gene expression of neprilysin, Journal of Pharmacy and Pharmacology, vol. 61, pp. 375â380, https://doi.org/1 (Year: 2010).*
Chen, Feng, Elizabeth A. Eckman, and Christopher B. Eckman. "Reductions in levels of the Alzheimer's amyloid β peptide after oral administration of ginsenosides." Faseb Journal 20.8 (2006).* (Year: 2006).*
Jeong, et al., "Extracellular Vesicles Released from Neprilysin Gene-Modified Human Umbilical Cord-Derived Mesenchymal Stem Cell Enhance Therapeutic Effects in an Alzheimer's Disease Animal Model" Stem Cells International, 2021, vol. 2021, pp. 1-20.
KR 10-2017-0044999, "Composition for improving skin and preventing hairloss and method for preparing the same," Apr. 26, 2017, English language translation of abstract, 1 page.
KR 10-2018-0131158, "Method for stimulating the secretion of exosome by stem cell and cosmetic composition comprising thereof," Dec. 10, 2018, English language machine translation of abstract, Espacenet, date obtained: Feb. 7, 2023, 1 page.

(Continued)

*Primary Examiner* — Tracy Vivlemore
*Assistant Examiner* — Fatimah Khalaf Matalkah
(74) *Attorney, Agent, or Firm* — Hoxie & Associates LLC

(57) ABSTRACT

Disclosed herein is a pharmaceutical composition containing a neprilysin-overexpressing stem cell, a conditioned medium thereof, and an exosome isolated therefrom as an active ingredient for prevention or treatment of cognitive impairment. Having the functions of protecting nerve cells, inhibiting the accumulation of amyloid beta, known as a cause of cognitive impairment-related disease in animal models, increasing an expression level of acetyl choline, and improving cognitive functions in animal models, the neprilysin-overexpressing stem cells, the conditioned medium thereof, or the exosomes isolated therefrom according to the present disclosure can find advantageous applications in treating cognitive impairment.

5 Claims, 8 Drawing Sheets
Specification includes a Sequence Listing.

(56) References Cited

OTHER PUBLICATIONS

KR 10-2019-0066885, "Composition for treating or preventing arthritis comprising culture solution of stem cell-derived exosome," Jun. 14, 2019, English language translation of abstract, 1 page.

KR 10-2019-0092978, "Pharmaceutical composition for preventing or treating neurodegenerative disease comprising turbinate mesenchymal stem cell as an active ingredient," Aug. 8, 2019, English language machine translation of abstract, Espacenet, date obtained: Feb. 7, 2023, 1 page.

KR 10-2021-0066636, "Pharmaceutical composition for preventing and treating optic nerve disease," Jun. 7, 2021, English language translation of abstract, 1 page.

"Membrane metallo-endopeptidase [*Homo sapiens*]," NCBI, GenBank accession No. AAI01633.1 (2007).

Shigematsu, et al., "Hypothesis: Intravenous administration of mesenchymal stem cells is effective in the treatment of Alzheimer's disease" Medical Hypotheses, 2021, vol. 150, pp. 1-3.

Yang Lingling, "Ginsenoside Rb1 and ginsenoside Rg3 inhibit the neurotoxicity of β-amyloid peptide by up-regulating neprilysin gene expression," Shandong University Doctoral Dissertation, Apr. 15, 2009, pp. 50-51, 81-82.

Zhang, et al. "HIF-1-mediated production of exosomes during hypoxia is protective in renal tubular cells" Am J Physiol Renal Physiol, vol. 313, 2017, pp. F906-F913.

\* cited by examiner

[Fig. 1]
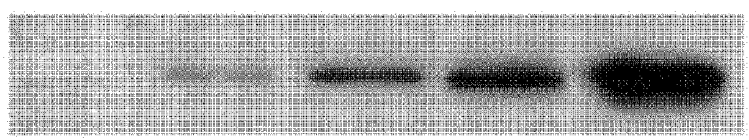
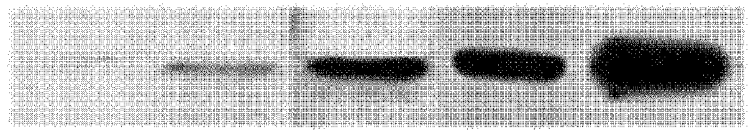

[Fig. 2]
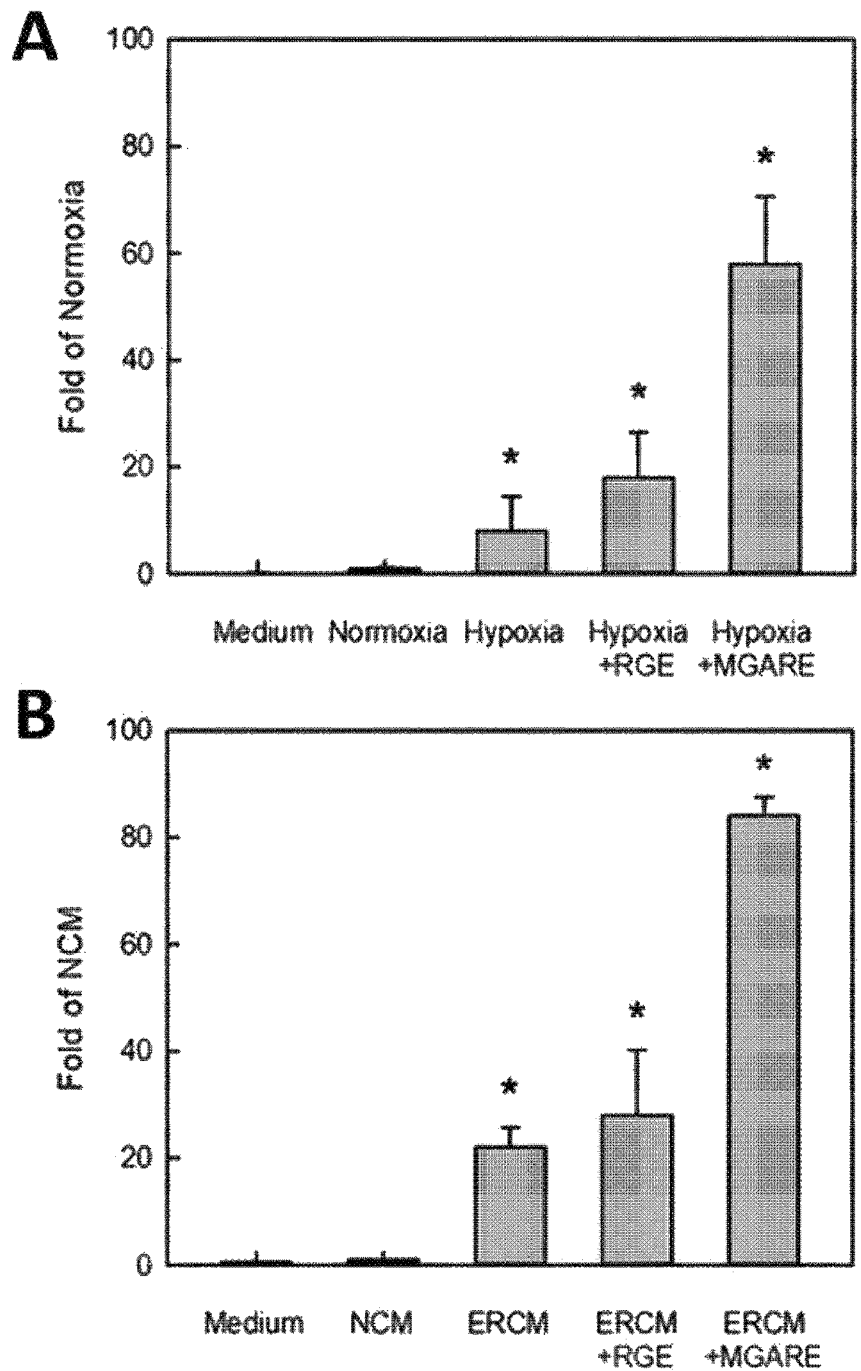

[Fig. 3]
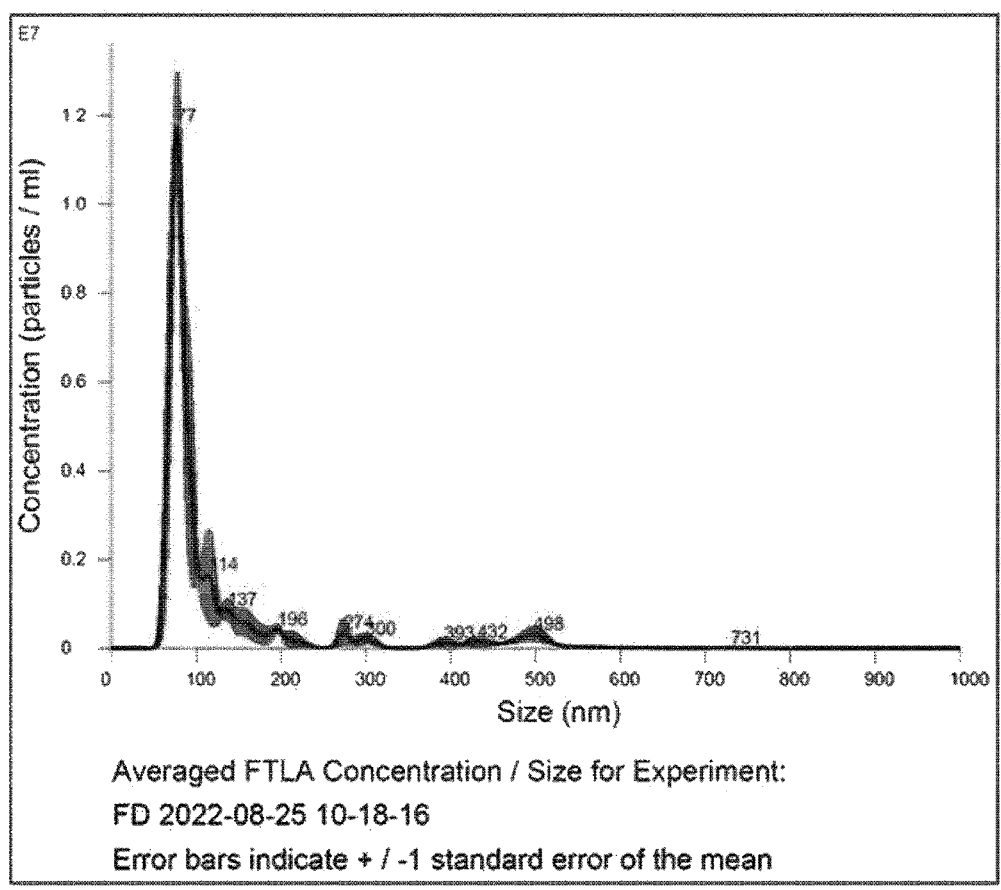

[Fig. 4]
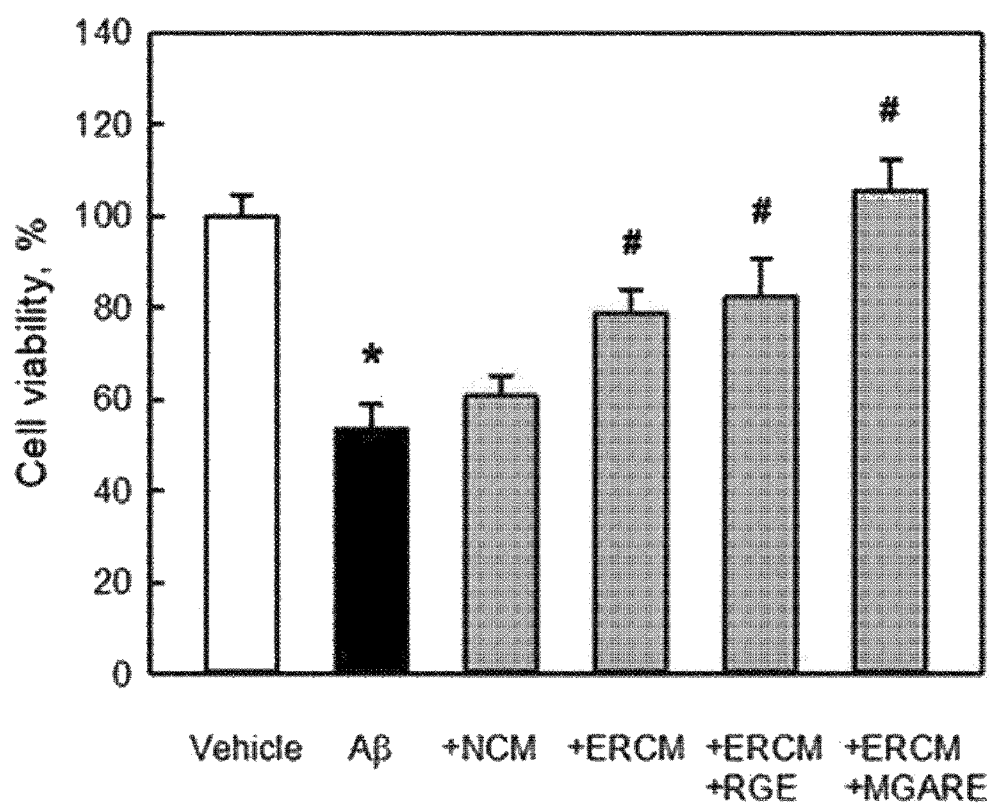

[Fig. 5]
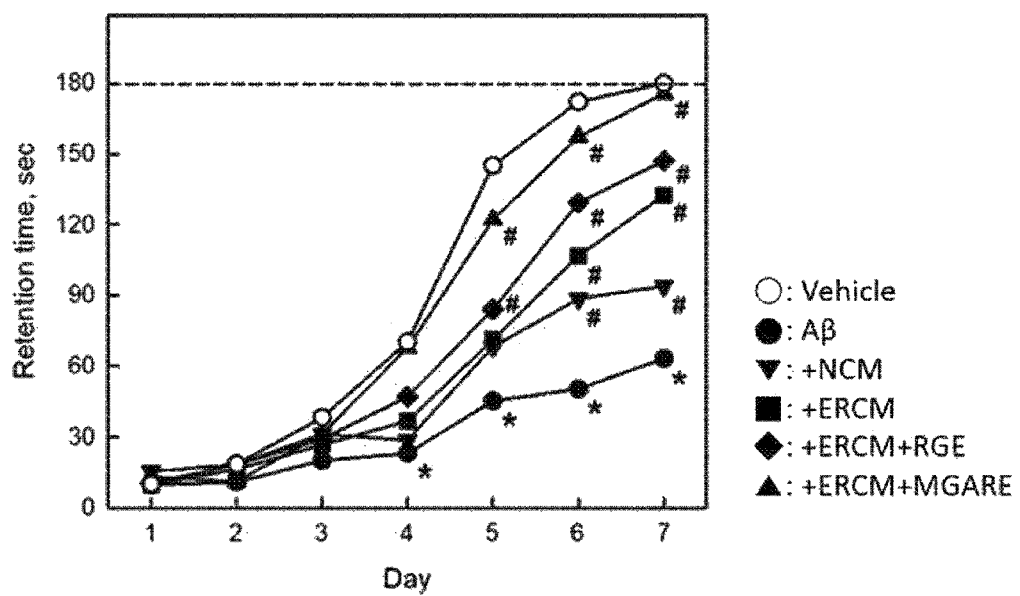

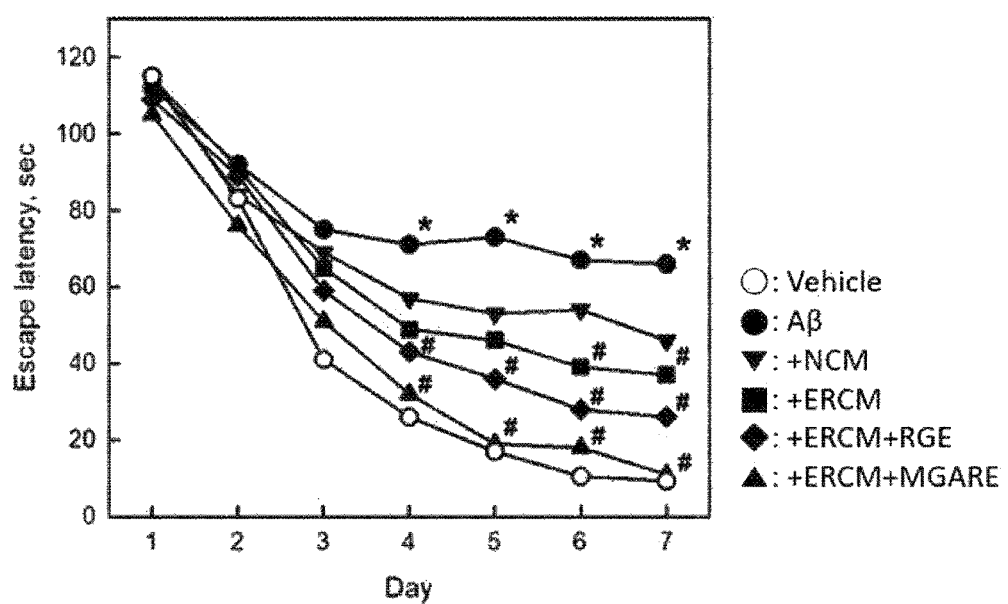
[Fig. 6]

[Fig. 7]
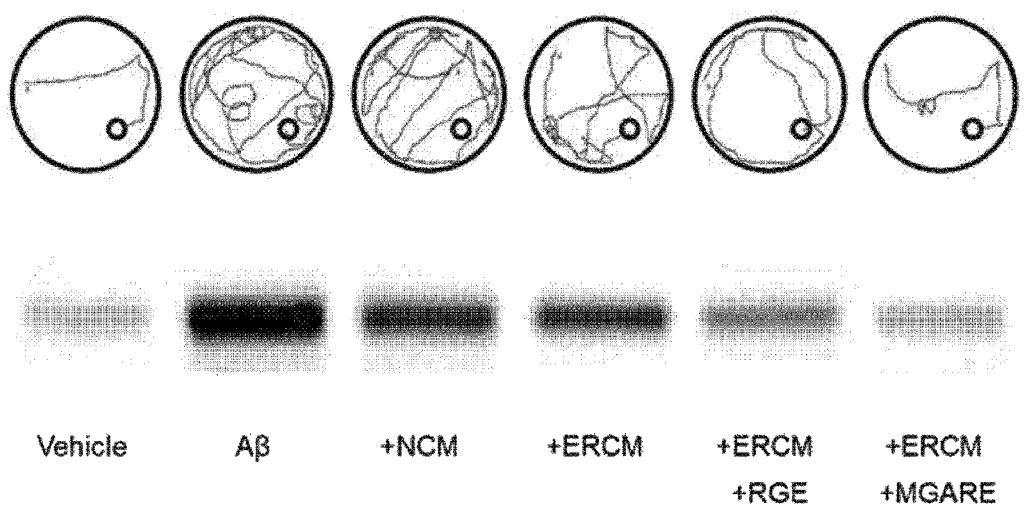

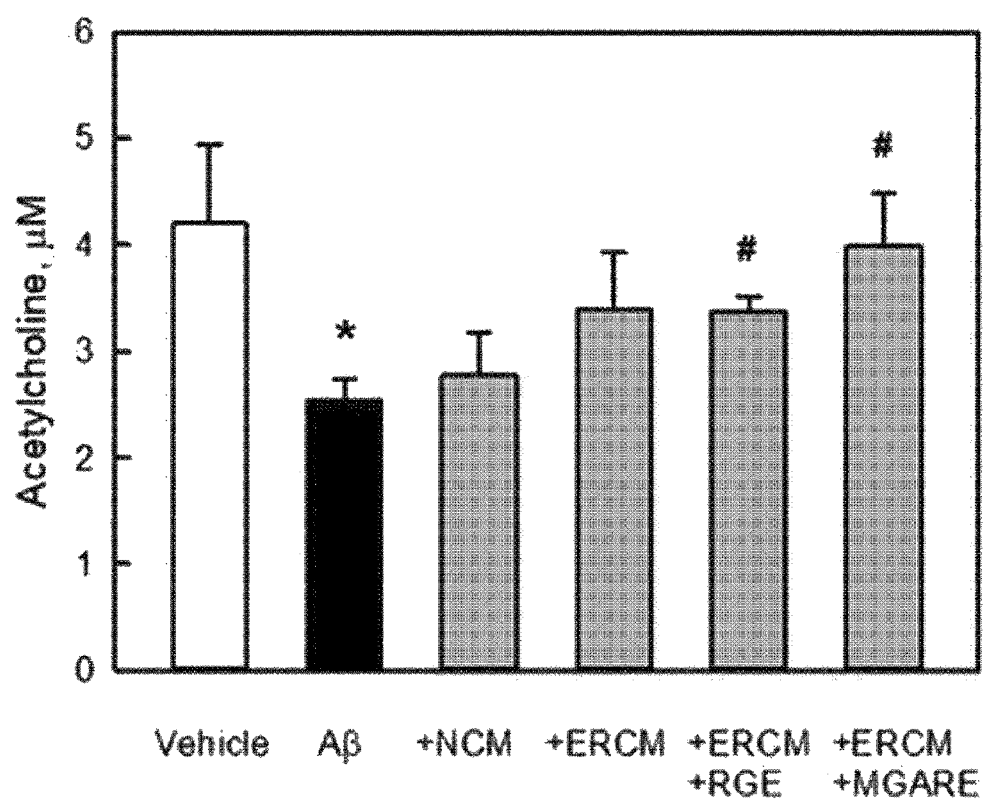
[Fig. 8]

SEQUENCE LISTING

```
Sequence total quantity: 1
SEQ ID NO: 1            moltype = AA  length = 750
FEATURE                 Location/Qualifiers
source                  1..750
                        mol_type = protein
                        organism = Homo sapiens
SEQUENCE: 1
MGKSESQMDI TDINTPKPKK KQRWTPLEIS LSVLVLLLTI IAVTMIALYA TYDDGICKSS  60
DCIKSAARLI QNMDATTEPC TDFFKYACGG WLKRNVIPET SSRYGNFDIL RDELEVVLKD 120
VLQEPKTEDI VAVQKAKALY RSCINESAID SRGGEPLLKL LPDIYGWPVA TENWEQKYGA 180
SWTAEKAIAQ LNSKYGKKVL INLFVGTDDK NSVNHVIHID QPRLGLPSRD YYECTGIYKE 240
ACTAYVDFMI SVARLIRQEE RLPIDENQLA LEMNKVMELE KEIANATAKP EDRNDPMLLY 300
NKMTLAQIQN NFSLEINGKP FSWLNFTNEI MSTVNISITN EEDVVVYAPE YLTKLKPILT 360
KYSARDLQNL MSWRFIMDLV SSLSRTYKES RNAFRKALYG TTSETATWRR CANYVNGNME 420
NAVGRLYVEA AFAGESKHVV EDLIAQIREV FIQTLDDLTW MDAETKKRAE EKALAIKERI 480
GYPDDIVSND NKLNNEYLEL NYKEDEYFEN IIQNLKFSQS KQLKKLREKV DKDEWISGAA 540
VVNAFYSSGR NQIVFPAGIL QPPFFSAQQS NSLNYGGIGM VIGHEITHGF DDNGRNFNKD 600
GDLVDWWTQQ SASNFKEQSQ CMVQYGNFS  WDLAGGQHLN GINTLGENIA DNGGLGQAYR 660
AYQNYIKKNG EEKLLPGLDL NHKQLFFLNF AQVWCGTYRP EYAVNSIKTD VHSPGNFRII 720
GTLQNSAEFS EAFHCRKNSY MNPEKKCRVW                                 750
```

PHARMACEUTICAL COMPOSITION CONTAINING NEPRILYSIN-OVEREXPRESSING STEM CELL, CONDITIONED MEDIUM THEREOF, AND EXOSOME ISOLATED THEREFROM AS ACTIVE INGREDIENT FOR PREVENTION OR TREATMENT OF COGNITIVE IMPAIRMENT

CROSS-REFERENCE TO RELATED APPLICATIONS

This application is a U.S. national application filed under 35 U.S.C. § 111 (a), which claims benefit to and priority of Korean Patent Application Nos. 10-2021-0129385, filed on Sep. 30, 2021, and 10-2022-0109195, filed on Aug. 30, 2022, the contents of each of which are hereby incorporated by reference in its entirety.

BACKGROUND OF THE INVENTION

1. Field of the Invention

The present disclosure relates to a pharmaceutical composition containing a neprilysin-overexpressing stem cell, a conditioned medium thereof, and an exosome isolated therefrom as an active ingredient for prevention or treatment of cognitive impairment.

2. Description of the Prior Art

Cognitive impairment results from a deficit in thought processing and includes loss of reasoning ability, forgetting, learning difficulties, concentration deficiency, decline in intelligence, or reduction of other mental functions. Cognitive impairment can be caused by a disease that occurred during the development of the fetus, childbirth, immediately after childbirth, or at any point in life and the cause cannot be identified in many cases. Meanwhile, early causes known for cognitive impairment include chromosomal abnormalities, heredity, malnutrition, drug exposure before childbirth, exposure to heavy metal, hypoglycemia, neonatal jaundice, hypothyroidism, trauma, hypoxia in the fetus, dystonia, and premature delivery.

Dementia, which is a type of cognitive impairment, is an age-related pathological phenomenon distinct from normal aging and is classified into Alzheimer's disease, vascular dementia, dementia resulting from alcoholism, and dementia resulting from traumatic brain injury. Inter alia, Alzheimer's disease, known as the most common dementia, usually occurs in a chronic and progressive pattern, with the gradual decline of cognitive functions such as memory, judgment, and language ability and the gradual impairment of daily living ability, personality, and behavioral patterns. Alzheimer's disease has remained unidentified for the pathology and mechanism thereof, thus far. The underlying causes are mainly explained by reduced synthesis of the neurotransmitter acetylcholine, accumulation of amyloid beta, and hyperphosphorylated tau protein-induced damage to neuronal cells.

The cholinergic hypothesis in Alzheimer's disease was established on the basis of the observation of cholinergic nerve damage in the brain tissue of Alzheimer's disease patients. Based on the cholinergic hypothesis, many attempts have recently been made to develop as a treatment for Alzheimer's disease a drug that inhibits the activity of acetylcholinesterase, which induces a decrease in the function of acetylcholine. Drugs currently used as therapeutic agents for Alzheimer's disease include acetylcholinesterase inhibitors, such as tacrine, donepezil, rivastigmine, and galantamine.

In this regard, Korean Patent Publication Number 10-2022-0061046 A, which pertains to combination therapy of donepezil and sildenafil for the treatment of Alzheimer's disease or cognitive impairment, disclosing that co-administration of donepezil and sildenafil is superior to administration of donepezil alone in terms of alleviative effect on Alzheimer's disease or cognitive impairment and thus can be used for treating the disease.

SUMMARY OF THE INVENTION

The present disclosure aims to provide a use of a neprilysin-overexpressing stem cell, a conditioned medium thereof, and an exosome isolated therefrom.

In order to accomplish the aim, the present disclosure provides a pharmaceutical composition containing at least one selected from the group consisting of a neprilysin-overexpressing stem cell, a conditioned medium thereof, and an exosome isolated therefrom as an active ingredient for prevention or treatment of cognitive impairment.

In addition, the present disclosure provides a health functional food containing at least one selected from the group consisting of a neprilysin-overexpressing stem cell, a conditioned medium thereof, and an exosome isolated therefrom as an active ingredient for prevention or alleviation of cognitive impairment.

Furthermore, the present disclosure provides a method for preventing, alleviating, or treating cognitive impairment, the method including a step of administering to a subject at least one selected from the group consisting of a neprilysin-overexpressing stem cell, a conditioned medium thereof, and an exosome isolated therefrom.

Moreover, the present disclosure provides a use of at least one selected from the group consisting of a neprilysin-overexpressing stem cell, a conditioned medium thereof, and an exosome isolated therefrom for preparing a medicinal agent for prevention, alleviation, or treatment of cognitive impairment.

Having the functions of protecting nerve cells, inhibiting the accumulation of amyloid beta, known as a cause of cognitive impairment-related disease in animal models, increasing an expression level of acetylcholine, and improving cognitive functions in animal models, the neprilysin-overexpressing stem cells, the conditioned medium thereof, or the exosomes isolated therefrom according to the present disclosure can find advantageous applications in treating cognitive impairment.

BRIEF DESCRIPTION OF THE DRAWINGS

The above and other aspects, features and advantages of the present disclosure will be more apparent from the following detailed description taken in conjunction with the accompanying drawings, in which:

FIG. 1 shows images of the expression of neprilysin in amniotic membrane-derived stem cells (A) and conditioned media of the stem cells (B), as analyzed by western blotting in an embodiment of the present disclosure;

FIG. 2 shows graphs of the expression levels of neprilysin in amniotic membrane-derived stem cells (A) and conditioned media of the stem cells (B) as analyzed by western blotting;

FIG. 3 is a chromatogram showing numbers and mean sizes of exosomes present in the conditioned media of amniotic membrane-derived stem cells in an embodiment of the present disclosure;

FIG. 4 is a graph showing protective effects of the normal conditioned medium (NCM) of amniotic membrane-derived stem cells, the exosome-rich conditioned medium (ERCM) obtained in a hypoxic condition, the exosome-rich conditioned medium obtained in the presence of a red ginseng (ERCM+RGE), and the exosome-rich conditioned medium (ERCM+MGARE) obtained in the presence of a cultivated wild ginseng extract against of amyloid beta-induced cytotoxicity in an embodiment of the present disclosure'

FIG. 5 is a plot showing cognitive function-improving effects of the normal conditioned medium (NCM) of amniotic membrane-derived stem cells, the exosome-rich conditioned medium (ERCM) obtained in a hypoxic condition, the exosome-rich conditioned medium obtained in the presence of a red ginseng (ERCM+RGE), and the exosome-rich conditioned medium (ERCM+MGARE) obtained in the presence of a cultivated wild ginseng extract as analyzed by an passive avoidance test in an embodiment of the present disclosure;

FIG. 6 is a plot showing cognitive function-improving effects of the normal conditioned medium (NCM) of amniotic membrane-derived stem cells, the exosome-rich conditioned medium (ERCM) obtained in a hypoxic condition, the exosome-rich conditioned medium obtained in the presence of a red ginseng (ERCM+RGE), and the exosome-rich conditioned medium (ERCM+MGARE) obtained in the presence of a cultivated wild ginseng extract as analyzed by a water-maze test in an embodiment of the present disclosure;

FIG. 7 shows swimming patterns of animal models to which the normal conditioned medium (NCM) of amniotic membrane-derived stem cells, the exosome-rich conditioned medium (ERCM) obtained in a hypoxic condition, the exosome-rich conditioned medium obtained in the presence of a red ginseng (ERCM+RGE), and the exosome-rich conditioned medium (ERCM+MGARE) obtained in the presence of a cultivated wild ginseng extract have been administered, as recorded in a water-maze test, together with the accumulation levels of amyloid beta in brain tissues of the animal models, in an embodiment of the present disclosure; and FIG. 8 is a graph of acetylcholine levels in brain tissues, showing the promotive effects of the normal conditioned medium (NCM) of amniotic membrane-derived stem cells, the exosome-rich conditioned medium (ERCM) obtained in a hypoxic condition, the exosome-rich conditioned medium obtained in the presence of a red ginseng (ERCM+RGE), and the exosome-rich conditioned medium (ERCM+MGARE) obtained in the presence of a cultivated wild ginseng extract on acetylcholine production in an embodiment of the present disclosure.

DETAILED DESCRIPTION OF THE EXEMPLARY EMBODIMENTS

Below, a detailed description will be given of the present disclosure.

The present disclosure provides a pharmaceutical composition containing at least one selected from the group consisting of neprilysin-overexpressing stem cells, a conditioned medium thereof, and an exosome isolated therefrom as an active ingredient for prevention or treatment of cognitive impairment.

As used herein, the term "stem cell" refers to an undifferentiated cell under relatively less development, which retains the potential to differentiate into a cell of a specific tissue. Stem cells can be classified into pluripotent stem cells, multipotent stem cells, and unipotent stem cells based on differentiation potency. In addition, their origins divide the stem cells into embryonic stem cells, adult stem cells, and induced pluripotent stem cells (iPSCs) that are produced from human somatic cells. Specifically, the stem cells according to the present disclosure may be adult stem cells. As used herein, the term "adult stem cells" refers to undifferentiated cells, found in adult tissues or organs, that retain the ability to differentiate into desired cells and self-renew. For instance, the stem cells according to the present disclosure may be amnion-derived adult stem cells.

The conditioned medium according to the present disclosure may be obtained by culturing aforementioned stem cells in a hypoxic condition. The hypoxic condition may be an oxygen concentration less than about 20%, which is an average oxygen condition in a normal atmosphere. Specifically, the hypoxic condition may be an oxygen concentration of 10% or less, 0.1 to 10%, 0.1 to 8%, 0.1 to 5%, 0.1 to 4%, 1 to 10%, 1 to 8%, 1 to 5%, 1 to 4%, 2 to 10%, 2 to 8%, 2 to 5% or 2 to 4%. In addition, the culturing may be carried out for 1 to 80 hours, 1 to 70 hours, 1 to 60 hours, 1 to 50 hours, 10 to 80 hours, 10 to 70 hours, 10 to 60 hours, 10 to 50 hours, 20 to 80 hours, 20 to 70 hours, 20 to 60 hours, 20 to 50 hours, 30 to 80 hours, 30 to 70 hours, 30 to 60 hours, 30 to 50 hours, 40 to 80 hours, 40 to 70 hours, 40 to 60 hours, or 40 to 50 hours.

The conditioned medium acquired as in the foregoing may contain a higher level of exosomes compared to cultures acquired in typical conditions. In order words, the conditioned medium may be an exosome-rich conditioned medium (ERCM). The term "exosome-rich conditioned medium" (ERCM) refers to a cultured medium of the stem cells having the aforementioned characteristics. That is, the pharmaceutical composition according to the present disclosure can attain the desired effect through not only the stem cells or the conditioned medium thereof, but also exosomes contained therein.

As used herein, the term "exosome" refers to an extracellular vesicle (EV) secreted in the form of a membrane structure from various types of cells. Exosomes with an average diameter of about 50 to 200 nm fuse to different cells or tissues and function to deliver membrane components, proteins, microRNA (miRNA), etc. The exosomes may be identified using a marker protein contained therein. The marker protein may be any of the marker proteins known in the art.

In addition, the conditioned medium may be obtained by culturing stem cells in a medium containing a Panax plant extract. The term "Panax plant" is intended to encompass any type of ginsengs known in the art. By way of example, the Panax plant may be at least one selected from the group consisting of ginseng, wild ginseng, red ginseng, wild simulated ginseng, mountain ginseng, fresh ginseng, and cultivated wild ginseng. It is well known in the art to prepare an extract from the Panax plants described above.

For instance, the Panax plant extract may be prepared by a method including the following steps of:

1) adding an extraction solvent to a Panax plant to obtain an extract from the plant;

2) filtering the extract of step 1); and 3) concentrating the filtrate of step 2) in a vacuum and drying the concentrate.

The extraction solvent may be water, alcohol, or a mixture thereof. The alcohol may be a lower alcohol of $C_1$ to $C_2$. Particularly, the alcohol may be ethanol, methanol, or liquor. The extraction solvent may be added in a suitable amount determined by a person skilled in the art. The extraction may be shaking extraction, cold precipitation extraction, reflux extraction, or supercritical fluid extraction. Extraction conditions can be appropriately adjusted by a person skilled in the art according to the extraction methods. The extraction may be conducted once or more times. The vacuum concentration in step 3) may take advantage of a vacuum concentrator or a vacuum rotary evaporator. The drying may be low-pressure drying, vacuum drying, boiling drying, spray drying, or freeze drying.

The stem cell conditioned medium according to the present disclosure may be filtered or enriched, as necessary, to remove impurities. A method of isolating the exosomes from the stem cell conditioned medium is also apparent in the art. The method may be carried out in an appropriately modified manner by a person skilled in the art as necessary.

As used herein, the term "neprilysin" refers to an enzymatic protein, also known as MME (membrane metalloendopeptidase), NEP (neutral endopeptidase), CD10 (cluster of differentiation 10), or CALLA (common acute lymphoblastic leukemia antigen), which is a zinc-dependent metalloprotease that cleaves peptides at the amino side of hydrophobic residues. Neprilysin is known to inactivate several peptide hormones including glucagon, enkephalins, neurotensin, and oxytosin.

The amino acid sequence of neprilysin or the nucleotide sequence coding therefor is well known in the art. So long as it retains the same intrinsic activity or corresponding activity, any mutant neprilysin protein in which one or more amino acid residues or nucleotides are added, deleted, or substituted may be available. In this regard, the substitution of amino acids or nucleotides may be conservative substitution in which substitution is performed within the range of having no or little influence on the charge of the entire protein, that is, polarity or hydrophobicity. In addition, the neprilysin protein or nucleic acid may have a homology of 80% or higher, 90% or higher, 95% or higher, 97% or higher, or 99% or higher with the known amino acid sequence or nucleotide sequence. Furthermore, the neprilysin protein may be a truncated protein as long as it retains the same or corresponding biological activity. For example, the neprilysin may consist of the amino acid sequence of SEQ ID NO: 1.

The conditioned medium of neprilysin-overexpressing stem cells according to the present disclosure may be obtained by adjusting the culture conditions as described above to induce the overexpression of neprilysin, but may also include a conditioned medium of stem cells having a neprilysin-encoding gene introduced thereinto. The method of introducing a neprilysin-encoding gene into stem cells is well known in the art and may be carried out in an appropriately modified manner by a person skilled in the art. For instance, the introduction of a neprilysin-encoding gene into stem cells may be achieved by microinjection, calcium phosphate precipitation, electroporation, liposome-mediated transfection, or DEAE-dextran treatment.

As used herein, the term "cognitive impairment" refers to any disease that is caused by cognitive dysfunction or in which cognitive function is troubled with the onset of a different disease. In detail, the cognitive impairment may be a disease in which the expression or aggregation level of amyloid beta is higher or at risk of being higher than normal. By way of example, the cognitive impairment may be dementia, Alzheimer's disease, senile dementia, pre-senile dementia, Parkinson's disease, Huntington's disease, mild cognitive impairment, cerebral amyloid angiopathy, Down syndrome, amyloid stroke, vascular stroke, systemic amyloid disease, Dutch type amyloidosis, Niemann-Pick disease, multiple sclerosis, Lewy body dementia, Creutzfeldt-Jacob disease, or frontotemporal dementia.

The pharmaceutical composition according to the present disclosure may contain the neprilysin-overexpressing stem cells, the conditioned medium thereof, and the exosomes isolated therefrom as an active ingredient in an amount of 10 to 95% by weight, based on the total weight thereof. In addition, the pharmaceutical composition of the present disclosure may further contain at least one substance that exhibits a function identical or similar to that of the active ingredient.

The pharmaceutical composition of the present disclosure may include generally used carriers, diluents, excipients, or a mixture thereof. So long as it is suitable for delivering the composition of the present disclosure in vivo, any pharmaceutically acceptable carrier may be used. Examples of the carrier include compounds described in Merck Index, 13th ed., Merck & Co. Inc., saline, sterilized water, Ringer's solution, dextrose solution, maltodextrin solution, glycerol, ethanol, or a mixture thereof. If necessary, a general additive such as an antioxidant, a buffer, and a bacteriostatic agent can be additionally added.

When the composition is formulated, a generally used diluent or excipient, such as a filler, an extender, a binder, a humectant, a disintegrant, a surfactant, etc. may be added.

The composition of the present invention can be formulated into an oral or parenteral preparation. The oral preparations may be in a solid or liquid phase. Examples of the solid formulation include tablets, pills, powders, granules, capsules, and troches, and such a solid formulation may be prepared by adding one or more excipients to the composition. The excipient may be starch, calcium carbonate, sucrose, lactose, gelatin, or a mixture thereof. In addition to the excipients, a lubricant, for example, magnesium stearate, talc, etc., can be used. The liquid formulation may be a suspension, a solution, an emulsion, or a syrup. In this regard, the liquid formulation may contain various excipients, such as wetting agents, sweeteners, aromatics, and preservatives.

Formulations for parenteral administration may include injections, suppositories, respiratory inhalation powders, spray aerosols, powders, eye drops, and creams. The injection may be exemplified by sterile aqueous solutions, non-aqueous solvents, suspending agents, and emulsions. As non-aqueous solvents or suspending agents, propylene glycol, polyethylene glycol, vegetable oil, such as olive oil, or injectable ester such as ethylolate may be used.

Also, the present disclosure provides a health functional composition containing at least one selected from the group consisting of neprilysin-overexpressing stem cells, a conditioned medium thereof, and exosomes isolated therefrom as an active ingredient for prevention or alleviation of cognitive impairment.

The neprilysin-overexpressing stem cells, the conditioned medium thereof, and the exosomes isolated therefrom which are contained in the health functional food according to the present disclosure may retain the same characteristics as in the foregoing.

The health functional food may be prepared by using the neprilysin-overexpressing stem cells, the conditioned medium thereof, and the exosomes isolated therefrom, which are an active ingredient, as they are or in combination with a different food or food ingredient. In this regard, the content of the active ingredient used may be determined according to a desired purpose and may generally range from 0.01 to 90 parts by weight based on 100 parts by weight of the entire food.

No particular limitations are imparted to forms and types of the health functional food. In detail, the health functional food may be in the form of tablets, capsules, pulvis, granules, liquids, or pills. The health function food may contain additional ingredients such as flavorants, sweeteners, and natural carbohydrates. The sweeteners may be natural or synthetic. Examples of the natural sweeteners include thaumatin and *stevia* extracts. The synthetic sweeteners may be exemplified by saccharin and aspartame. In addition, the natural carbohydrates may be monosaccharides, disaccharides, polysaccharides, oligosaccharides, and sugar alcohols.

In addition to the aforementioned ingredients, the health functional food of the present disclosure may further contain various nutrients, vitamins, electrolytes, flavoring agents, colorants, pectic acid and salts thereof, alginic acid and salts thereof, organic acids, protective colloidal viscosifiers, pH adjuster, stabilizers, antiseptics, glycerin, alcohols, etc. All these ingredients may be added singly or in combination. Those ingredients may be used in an amount of 0.01 to 0.1 parts by weight, based on 100 parts by weight of the composition of the present disclosure.

Furthermore, the present disclosure provides a method for preventing, alleviating, or treating cognitive impairment, the method including a step of administering to a subject at least one selected from the group consisting of neprilysin-overexpressing stem cells, a conditioned medium thereof, and exosomes isolated therefrom.

The neprilysin-overexpressing stem cells, the conditioned medium thereof, and the exosomes isolated therefrom used in the method for prevention, alleviation, or treatment of cognitive impairment according to the present disclosure may have the same characteristics as in the foregoing. In addition, the cognitive impairment may be as described above.

The subject may be a mammalian and particularly a human.

In addition, the administration may be oral or parenteral according to desired purposes. Parenteral administration may be carried out by intraperitoneal, intrarectal, intranasal, subcutaneous, intravenous, intramuscular, or intrathoracic injection.

The administration may be injected at a pharmaceutically effective dose. The pharmaceutically effective dose may vary depending on various factors including kinds of disease, severity of disease, the patient's sensitivity to drug, administration time and route, treatment period, drugs to be used simultaneously, etc. For a desired effect, the dose of the ingredient of the present disclosure may range from 0.0001 to 1,000 mg/kg and particularly from 0.001 to 500 mg/kg. The administration may be once or many times a day. The administration may be once or many times a day.

The administration may be alone or in combination with a different therapeutic agent. The combination administration may be conducted sequentially or simultaneously.

Moreover, the present disclosure provides a use of at least one selected from the group consisting of neprilysin-overexpressing stem cells, a conditioned medium thereof, and exosomes isolated therefrom in preparing a medicinal agent for prevention, alleviation, or treatment of cognitive impairment.

The neprilysin-overexpressing stem cells, the conditioned medium thereof, and the exosomes isolated therefrom used in preparing a medicinal agent for prevention, alleviation, or treatment of cognitive impairment according to the present disclosure may have the same characteristics as in the foregoing. In addition, the cognitive impairment may be as described above.

Below, a better understanding of the present disclosure may be obtained through the following Examples which are set forth to illustrate, but are not to be construed to limit, the present disclosure. Anything that has substantially the same configuration and achieves the same effect as the technical idea described in the claims of the present disclosure falls within the technical scope of the present disclosure.

Example 1. Preparation of Exosome-Rich Conditioned Medium

Human amniotic membrane-derived stem cells (AMSC) were cultured as follows, so as to increase exosome contents in the cells and the conditioned medium thereof.

First, after deliberation by the Institutional Review Board (IRB) of Korea University Anam Hospital, a consent was obtained from each healthy pregnant women, and amniotic membranes were collected following cesarean section delivery. Amniotic membrane-derived stem cells were isolated from the collected amnion and cultured in GIBCO DMEM/F12 medium (Life Technologies) for 24 hours under the condition of 5% carbon dioxide and 20% oxygen. The cells were seeded at a density of $1 \times 10^6$ cells/ml in a fresh medium for 48 hours under a 3% oxygen condition. Thereafter, the conditioned medium was filtered through a filter having a pore size of 0.2 μm and 30-fold concentrated using Viva flow. As a result, exosome-rich conditioned medium (ERCM) was obtained from amniotic membrane-derived stem cells.

Example 2. Preparation of Exosome-Rich Conditioned Medium Using Red Ginseng Extract An exosome-rich conditioned medium was prepared in the same condition and manner as in Example 1, with the exception of adding a red ginseng extract at a concentration of 1 mg/ml to the medium.

Example 3. Preparation of Exosome-Rich Conditioned Medium Using Cultivated Wild Ginseng Extract An exosome-rich conditioned medium was prepared in the same condition and manner as in Example 1, with the exception of adding a cultivated wild ginseng extract at a concentration of 1 mg/ml to the medium.

Example 4. Preparation of Normal Conditioned Medium

A normal conditioned medium was prepared in the same condition and manner as in Example 1, with the exception that the cells were seeded at a density of $1 \times 10^6$ cells/ml and cultured in a 20% hydrogen condition.

Experimental Example 1. Expression Level of Neprilysin

Expression levels of neprilysin (NEP) in the conditioned medium of the amniotic membrane-derived stem cells obtained above and in the stem cells themselves were examined using western blotting.

First, proteins were extracted from the cultured amniotic membrane-derived stem cells with the aid of a mammalian protein extraction reagent (Pierce) and total protein was quantitatively analyzed by the BCA (bicinchoninic acid, Bradford) method. The quantitated protein and the conditioned media of the amniotic membrane-derived stem cells were run in an SDS-polyacrylamide gel by electrophoresis and the separated proteins were transferred onto a polyvinyllidine difluoride (PVDF) membrane. The PVDF membrane was incubated with an anti-NEP antibody (1:5,000, Abcam) at room temperature for 1 hour and washed with a TBS-T buffer. Again, the membrane was incubated with the secondary antibody, IgG-HRP-linked whole antibody, at room temperature for an additional one hour. Thereafter, the horseradish peroxidase (HPR) on immunoblots in the PVDF membrane was detected using the ECL plus western blotting detection system (GE HealthCare) and analyzed with the LuminolImager (Fuji Film). Images of the expressed neprilysin thus detected were taken and are given in FIG. 1 and the quantitatively analysis results are depicted in FIG. 2.

As shown in FIGS. 1 and 2, expression levels of neprilysin in the amniotic membrane-derived stem cells and the conditioned medium of the amniotic membrane-derived stem cells cultured in a hypoxic condition were significantly higher than that in the normoxic condition. Particularly, more remarkable increases were found in the expression level of neprilysin when the cells were cultured in the presence of a red ginseng extract or cultivated wild ginseng extract under a hypoxic condition.

Experimental Example 2. Number of Exosome

Exosomes in the conditioned medium of the amniotic membrane-derived stem cells were counted by typical nanoparticle tracking analysis (NTA) and the results are depicted in FIG. 3 and summarized in Table 1.

TABLE 1

| Example | No. of exosome | Fold |
|---|---|---|
| Example 4 | $1.35 \times 10^9$/ml | 1.00 |
| Example 1 | $8.05 \times 10^9$/ml | 5.96 |
| Example 2 | $1.77 \times 10^{10}$/ml | 13.11 |
| Example 3 | $4.15 \times 10^{10}$/ml | 30.74 |

As shown in FIG. 3, the exosomes present in the conditioned media had a mean size of 77 nm. Data in Table 1 show $1.35 \times 10^9$ exosomes per ml of the normal conditioned medium, indicating that when amniotic membrane-derived stem cells were cultured in a hypoxic condition, exosomes remarkably increased in number, compared to those in the normal conditioned medium. Among others, the conditioned medium obtained in the presence of a red ginseng extract or a cultivated wild ginseng extract contained 13.11- and 30.74-fold more exosomes, respectively, compared to the normal conditioned medium.

Experimental Example 3. Neuroprotective Effect

The conditioned medium of amniotic membrane-derived stem cells obtained above were examined for protective effect on nerve cells. In this regard, the neural stem cell line (F3.ChAT) expressing choline acetyltransferase (ChAT), an enzyme which synthesizes acetylcholine (ACh) implicated in cognitive function establishment, was subjected to MTT assay.

First, F3.ChAT cell line (KCTC 12885BP, Korea) was seeded at a density of $1 \times 10^6$ cell/ml into 96-well plates and incubated overnight. Then, the cells were treated with 10 μl/ml of each of the conditioned medium prepared in the foregoing Example and 5 μM amyloid beta (Aβ) for an additional 24 hours. Thereafter, the cells were further incubated for 2 hours in the presence of 50 μl/ml MTT. After removal of the media, the cells were added with 100 μl/ml dimethylsulfoxide (DMSO) and left for 30 minutes to allow the formation of formazan. The formed formazan was dissolved, followed by reading absorbance at 570 nm. Cell viability was calculated from the absorbance measurements and is depicted in FIG. 4.

As can be seen in FIG. 4, the cell viability was decreased by treatment with amyloid beta, but significantly increased to 78.8% in the conditioned medium of the amniotic membrane-derived stem cells cultured in a hypoxic condition. Particularly, the conditioned medium of amniotic membrane-derived stem cells cultured in the presence of a red ginseng extract or a cultivated wild ginseng extract remarkably increased the cell viability to up to 82.4% and 105.6%, respectively.

From the data, it was thus understood that the conditioned medium according to the present disclosure exhibited a neuroprotective effect against the toxicity of amyloid beta.

Experimental Example 4. Improvement of Cognitive Function

The conditioned medium of amniotic membrane-derived stem cells prepared above were examined for improvement effect on cognitive function, using a dementia animal model.

4-1. Drug Administration

The experiment was performed under the approval of the Institutional Animal Care and Use Committee (IACUC) of the Center for Laboratory Animal Research, Chungbuk National University, and in accordance with the Standard Operation Procedures (SOP) of the institution.

First, 6-week-old male ICR mice (25 to 30 g) were anesthetized by ether inhalation and then fixed stereotaxic frame. Dementia was induced by injecting 1 μg/μl amyloid beta at a dose of 5 μl to each mouse. In this regard, amyloid beta was injected into the ventricle 2.0 mm posteriorly, 2.9 mm laterally and 3.0 mm dorsally from bregma. After 24 hours, the conditioned media were infused at a dose of 0.1 ml into vessels.

4-2. Passive Avoidance Test

A passive avoidance test was conducted 7 times at regular intervals of 30 minutes in one day 48 hours after administration of amyloid beta. In brief, an animal was placed in a bright room of a passive avoidance box (Med Associated) divided into a dark room and a bright room, and when the animal moved to the dark room, an electric shock was applied at 1 mA for 2 seconds. Then, in order to confirm the memory of the electric shock in the dark room, the memory was evaluated by measuring the time the animals stayed in the bright room in the same test. Measurements of the residence time in the bright room is depicted in FIG. 5.

As shown in FIG. 5, the residence time in a bright room decreased by treatment with amyloid beta was significantly increased by the conditioned medium of amniotic membrane-derived stem cells cultured in a hypoxic condition. The residence time was further improved by the conditioned medium of amniotic membrane-derived stem cells cultured in the presence of a red ginseng extract or a cultivated wild ginseng extract. Particularly, the conditioned medium of amniotic membrane-derived stem cells cultured in the presence of a cultivated wild ginseng extract restored the residence time in the bright room to that of normal subjects.

4-3. Water-Maze Test

A water-maze test was conducted once a day for 7 days after administration of amyloid beta. Briefly, a round bath was filled with water and maintained at a temperature of 22±2° C. A rescue platform was installed in the water and Styrofoam was floated on the water to hide the platform. The animal was placed in the water bath and allowed to remember the markers around the water bath, and the time it took to find the platform located at a certain place in the water bath was measured. If the animal did not find the platform even after 180 seconds had elapsed, the animal was left on the platform for 30 seconds to induce memory. The swimming distance and pattern was recorded using a CCTV tracking system. Measurements of the time to find the platform are depicted in FIG. 6.

As can be seen in FIG. 6, the time required to find the platform was increased by treatment with amyloid beta, but significantly reduced by the conditioned medium of amniotic membrane-derived stem cells cultured in a hypoxic condition. The time was further reduced by the conditioned medium of amniotic membrane-derived stem cells cultured in the presence of a red ginseng extract or a cultivated wild ginseng extract. Particularly, the conditioned medium of amniotic membrane-derived stem cells cultured in the presence of a cultivated wild ginseng extract reduced the time required to find the platform to a level similar to that of normal subjects.

Experimental Example 5. Content of Amyloid Beta in Cerebral Tissue

By western blotting, examination was made of contents of amyloid beta in cerebral tissues from the animals in which the cognitive function improving effects of the conditioned medium of amniotic membrane-derived stem cells had been confirmed.

First, the mice in which the cognitive function improving effects of the conditioned medium of amniotic membrane-derived stem cells had been confirmed were sacrificed 24 hours after completion of the test. The brain was sufficiently perfused with cold saline before the excision thereof. The excised brain was weighed, frozen in liquid water, and stored at −80° C. until use. The brain was added with a 10-fold volume of chilled PBS and homogenized using a homogenizer. Western blotting was carried out for the homogenate in the same manner and condition as in Experimental Example 1 with the exception of using an anti-amyloid beta antibody (1:1,000, Abcam) as a primary antibody. The data of the amyloid beta expression levels in the cerebral tissue are given, together with the records of mouse swimming pattern in the water-maze test, in FIG. 7.

As shown in FIG. 7, the amyloid beta-administered mice required long times to find the platform and had significantly high expression levels of amyloid beta, compared to normal animals. On the other hand, the administration of the conditioned medium of amniotic membrane-derived stem cells significantly reduced the time took to find the platform and decreased the expression level of amyloid beta. Compared to the normal conditioned medium, these effects were remarkable in the conditioned medium obtained in a hypoxic condition and further remarkable especially in the conditioned medium obtained in the presence of a red ginseng extract or a cultivated wild ginseng extract.

The data indicate that the conditioned medium of amniotic membrane-derived stem cells can make a recovery from the cognitive impairment attributed to accumulated amyloid beta known as a cause of dementia.

Experimental Example 6. Acetylcholine in Cerebral Tissue

Using the Amplex Red Acetylcholine/Acetylcholinesterase Assay Kit (Invitrogen), examination was made of the content of acetylcholine in the brain tissue from the animal model in which the cognitive function improving effects of the conditioned medium of amniotic membrane-derived stem cells had been confirmed. The experiment was conducted with the brain homogenate obtained in the foregoing using the kit according to the manufacturer's protocol. Expression levels of acetylcholine were measured and are depicted in FIG. 8.

As shown in FIG. 8, amyloid beta-administered mice remarkably decreased in acetylcholine expression level, compared to normal mice. The levels were restored by treatment with the conditioned medium of amniotic membrane stem cell and especially to the level similar to that in normal mice when treated with the conditioned medium obtained in the presence of the cultivated wild ginseng extract.

What is claimed is:

1. A method for preventing, alleviating, or treating cognitive impairment, the method comprising steps of culturing stem cells in a medium containing a Panax plant extract to obtain a neprilysin-overexpressing stem cell, and administering to a subject in need thereof at least one selected from the group consisting of the neprilysin-overexpressing stem cell, a conditioned medium thereof, and an exosome isolated therefrom, wherein the cognitive impairment is a disease in which the expression or aggregation level of amyloid beta is higher or at risk of being higher than normal, and wherein the Panax plant is at least one selected from the group consisting of red ginseng and cultivated wild ginseng.

2. The method of claim 1, wherein the stem cells are amniotic membrane-derived stem cells.

3. The method of claim 1, wherein the conditioned medium is obtained by culturing stem cells in an oxygen condition of 10% or less.

4. The method of claim 1, wherein the cognitive impairment is dementia, Alzheimer's disease, senile dementia, pre-senile dementia, Parkinson's disease, Huntington's disease, mild cognitive impairment, cerebral amyloid angiopathy, Down syndrome, amyloid stroke, vascular stroke, systemic amyloid disease, Dutch type amyloidosis, Niemann-Pick disease, multiple sclerosis, Lewy body dementia, Creutzfeldt-Jacob disease or frontotemporal dementia.

5. The method of claim 1, wherein the neprilysin is composed of the amino acid sequence of SEQ ID NO: 1.

* * * * *